(12) United States Patent
Jung et al.

(10) Patent No.: US 12,368,175 B2
(45) Date of Patent: Jul. 22, 2025

(54) SOLID OXIDE FUEL CELL COMPRISING ANODE ALKALINE-BASED PROMOTER LOADED

(71) Applicant: KOREA ADVANCED INSTITUTE OF SCIENCE AND TECHNOLOGY, Daejeon (KR)

(72) Inventors: WooChul Jung, Daejeon (KR); Dae-Kwang Lim, Daejeon (KR); Jinwook Kim, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 18/659,291

(22) Filed: May 9, 2024

(65) Prior Publication Data
US 2024/0297320 A1   Sep. 5, 2024

Related U.S. Application Data

(62) Division of application No. 17/438,485, filed as application No. PCT/KR2020/019414 on Dec. 30, 2020, now abandoned.

(30) Foreign Application Priority Data

Jun. 24, 2020   (KR) .................... 10-2020-0077017

(51) Int. Cl.
| | |
|---|---|
| H01M 8/083 | (2016.01) |
| H01M 4/86 | (2006.01) |
| H01M 4/90 | (2006.01) |
| H01M 8/0217 | (2016.01) |
| H01M 8/12 | (2016.01) |
| H01M 8/1246 | (2016.01) |

(52) U.S. Cl.
CPC ......... *H01M 8/083* (2013.01); *H01M 4/8621* (2013.01); *H01M 4/9033* (2013.01); *H01M 8/0217* (2013.01); *H01M 8/1246* (2013.01); *H01M 2008/1293* (2013.01)

(58) Field of Classification Search
None
See application file for complete search history.

(56) References Cited

U.S. PATENT DOCUMENTS

| | | | | |
|---|---|---|---|---|
| 5,993,986 | A * | 11/1999 | Wallin | H01M 8/2404 429/465 |
| 2004/0180000 | A1* | 9/2004 | Hagemeyer | B01J 23/6562 423/656 |
| 2010/0143820 | A1 | 6/2010 | Luo et al. | |
| 2010/0167919 | A1* | 7/2010 | Lee | B01J 35/30 502/324 |
| 2015/0099212 | A1 | 4/2015 | Bierschenk et al. | |
| 2018/0323443 | A1* | 11/2018 | Tucker | H01M 4/8621 |

FOREIGN PATENT DOCUMENTS

| | | |
|---|---|---|
| CN | 104078687 | 10/2014 |

OTHER PUBLICATIONS

SIPO, Office Action of CN 202080023185.1 dated Oct. 15, 2024.

* cited by examiner

*Primary Examiner* — Ula C Ruddock
*Assistant Examiner* — Mary Grace Byram
(74) *Attorney, Agent, or Firm* — LEX IP MEISTER, PLLC

(57) ABSTRACT

A solid oxide fuel cell according to this invention can provide a solid oxide fuel cell with improved performance, by loading an alkali-based promoter in an anode.

8 Claims, 6 Drawing Sheets

Top-view

Cross-section

SOLID OXIDE FUEL CELL COMPRISING ANODE ALKALINE-BASED PROMOTER LOADED

TECHNICAL FIELD

This invention relates to a solid oxide fuel cell having improved performance, by loading an alkali-based promoter in an anode.

BACKGROUND ART

SOFC (solid oxide fuel cell) is an energy conversion device that directly converts chemical energy into electric energy, and consists of an oxygen ion conductive electrolyte, and a cathode and an anode positioned on both sides thereof.

If air and fuel are supplied to each electrode of a solid oxide fuel cell, in a cathode, oxygen is reduced to produce oxygen ions, and the produced oxygen ions move to an anode through an electrolyte, and react with hydrogen supplied in the anode to produce water. Wherein, since electrons are produced in the anode and electrons are consumed in the cathode, if both electrodes are connected with each other, it is operated in such a way that electricity flows.

Since a solid oxide fuel cell is operated at high temperature, studies for lowering the operation temperature are being progressed, and it is generally related to the performances of a cathode and anode. Although various cathode materials having high electronic-ionic conductivity are being developed, excellent anode material that can replace Ni has not been developed so far.

Therefore, there is a demand for development of an anode having high performance even when the operation temperature of a solid oxide fuel cell decreases.

DISCLOSURE

Technical Problem

It is an object of the invention to provide a solid oxide fuel cell having improved performance, by loading an alkali-based promoter in an anode.

Technical Solution

To solve the problem, a solid oxide fuel cell comprises a cathode, an anode, and an electrolyte between the cathode and anode, wherein at least a part of the anode's pores comprises a promoter is an alkali metal compound.

Since a solid oxide fuel cell is operated at high temperature, particularly the performances of a cathode and an anode should be improved so as to lower the operation temperature, and this invention is characterized by improving the performance of an anode.

Previously, the material or shape of an anode was controlled so as to improve the performance of an anode, but performance improvement was limitative and technological reproduction was difficult. However, this invention improves the performance of an anode by introducing an alkali metal precursor while using previously used material or shape of an anode as it is.

The term 'promoter' as used herein is used to improve the performance of an anode, and it is loaded in an anode to improve the performance without disrupting the component or shape of an anode, and in this respect, a component loaded in an anode is referred to as a 'promoter' herein.

The promoter according to this disclosure exists in the pores of an anode, and when a solid oxide fuel cell is operated, gas introduced in the anode, for example, hydrogen, hydrocarbon fuel, and the like, contacts the promoter. Thus, the description "at least a part of the pores of the anode comprises a promoter" as used herein means that the promoter is inserted in at least a part of the pores of the anode, and when a solid oxide fuel cell is operated, gas introduced in the anode can contact the promoter in the pores of the anode. Meanwhile, a method for loading the promoter in an anode will be explained later.

The promoter herein means an alkali metal compound. Preferably, the alkali metal compound means alkali metal oxide, alkali metal hydroxide, or a combination thereof.

Specifically, when the alkali metal of the alkali metal compound is M, the alkali metal oxide may be represented by $M_2O$, and the alkali metal hydroxide may be represented by MOH. As the examples of the alkali metal (M), lithium (Li), sodium (Na), potassium (K) or cesium (Cs) may be mentioned.

Although not theoretically limited, the promoter exists in the pores of an anode, and simultaneously, contacts the anode, and thus, when the surface of an anode is partially oxidized and moisture is introduced in the pores of the anode, a large quantity of moisture is adsorbed on the surface of the anode. Thereby, the promoter relieves a strong bond between an anode and hydrogen introduced in the anode, thus promoting the oxidation of hydrogen in an anode, and broadening the area in which hydrogen reacts, thereby improving the performance of an anode. Further, it can inhibit deposition of carbon on an anode during the operation of a solid oxide fuel cell.

In this respect, the anode is preferably a metal-ceramic complex anode. More preferably, the metal of the metal-ceramic complex is Ni. Most preferably, the anode is a complex of Ni and GDC (Gd doped $CeO_2$).

As explained above, since the anode of the solid oxide fuel cell according to this disclosure comprises a promoter loaded therein, electrode resistance is low, compared to an anode of a solid oxide fuel cell that does not comprise the promoter. The comparison of electrode resistance is under the same conditions except loading of the promoter, for example, the same construction of a solid oxide fuel cell, the same operation conditions, and the like.

Preferably, the electrode resistance of the anode of the solid oxide fuel cell is 10% or less of the electrode resistance of an anode of a solid oxide fuel cell that does not comprise the promoter, and more preferably, 90% or less, 80% or less, 70% or less, 60% or less, 50% or less, 40% or less, 30% or less, 20% or less, 10% or less, 9% or less, 8% or less, 7% or less, 6% or less, or 5% or less.

Further, as described in examples below, it can be confirmed that the electrode resistance of an anode according to loading of the promoter is stably maintained for long time operation of the solid oxide fuel cell.

There is also provided a method for manufacturing the above explained solid oxide fuel cell. Specifically, there is provided a method for preparing the above explained solid oxide fuel cell, comprising steps of: introducing an alkali metal precursor in at least a part of pores of the anode (step 1); and producing the promoter from the alkali metal precursor (step 2).

In order to load a promoter in the pores of the anode of a solid oxide fuel cell, the promoter should be loaded while pores are formed in the anode, and thus, it is difficult to directly load the promoter in the pores of an anode. Thus, in this disclosure, an alkali metal precursor is introduced in at least a part of the pores of an anode, and then, a promoter is produced from the alkali metal precursor through a chemical reaction.

Preferably, the alkali metal precursor is alkali metal carbonate or alkali metal nitrate. As explained above, when the alkali metal is M, as the examples of the alkali metal (M), lithium (Li), sodium (Na), potassium (K), or cesium (Cs) may be mentioned, the alkali metal carbonate may be represented by $M_2CO_3$, and the alkali metal nitrate may be represented by $MNO_3$.

Preferably, the step 1 is conducted by coating a solution comprising the alkali metal precursor on the surface of the anode, or immersing the anode in a solution comprising the alkali metal precursor. Thereby, a solution comprising the alkali metal precursor may be introduced in the pores of an anode. This method can be applied in case the operation of a solid oxide fuel cell is stopped and the temperature is decreased to room temperature, as well as during manufacture of the anode of a solid oxide fuel cell, Preferably, the step 1 may be conducted by introducing a solution comprising the alkali metal precursor in a gas line for introducing fuel in the anode. A solid oxide fuel cell has a gas line for introducing fuel in an anode, and if a solution comprising an alkali metal precursor is introduced in the gas line, the solution comprising the alkali metal precursor may be introduced in the pores of an anode. Such a method can be applied during the operation of a solid oxide fuel cell.

Preferably, the step 1 may be conducted by bonding a current collector comprising the alkali metal precursor on the surface of the anode. In a solid oxide fuel cell, an anode contacts a current collector, and thus, by including an alkali metal precursor in the current collector, the alkali metal precursor may be introduced in the anode. Wherein, the alkali metal precursor may be applied in the form of power as well as in the form of a solution. Such a method can be applied during manufacture of a solid oxide fuel cell.

Preferably, the step 2 is conducted by introducing fuel or moisture in a gas line for introducing fuel in the anode. If fuel or moisture is introduced, it reacts with the alkali metal precursor existing in the pores of the anode, and thereby, the alkali metal precursor is converted into the above explained promoter. Further, it is preferable that the fuel comprises hydrogen.

Meanwhile, for the other constructions except using the above explained anode of this disclosure, previously applied constructions of a solid oxide fuel cell may be applied.

Advantageous Effects

As explained above, if a promoter is loaded in an anode according to this disclosure, the performances of a solid oxide fuel cell can be remarkably improved without modification of the material or shape of an anode.

MODE FOR INVENTION

Hereinafter, examples and experimental examples of the invention will be explained in detail. These examples and experimental examples are presented to explain the invention more specifically, and the scope of the invention is not limited thereby.

Example 1: Confirmation of Loading of Promoter

In order to confirm whether or not the promoter according to this disclosure is loaded in an anode, the following experiments were conducted.

Figure 1:
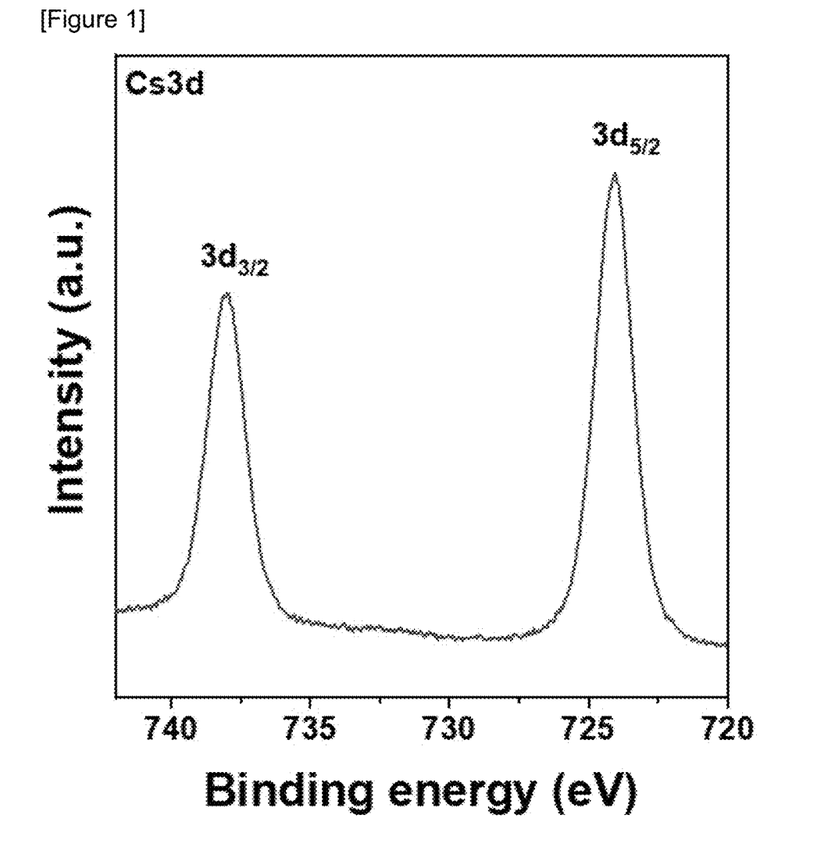
FIG. 1 shows the XPS results according to Example 1.

Mixed powder of $CsNO_3$, NiO, GDC (10% Gd doped $CeO_2$) (1:5.4:3.6 weight ratio) was heat treated at 450° C. for 10 hours under 3% humidified 10% hydrogen atmosphere (3% $H_2O$+10% $H_2$+87% Ar), and then, XPS (Cs3d) was measured and the result was shown in FIG. 1.

As shown in FIG. 1, the existence of Cs can be confirmed, and it can be confirmed therefrom that a Cs precursor is loaded in an anode as a promoter.

Example 2: Performance Evaluation in Half Cell

Step 1) Manufacture of Half Cell

After molding GDC (10% Gd doped $CeO_2$) powder, it was sintered at 1450° C. for 5 hours. Further then, the surface was planarized using a sandpaper, thus manufacturing a GDC specimen.

Figure 2:
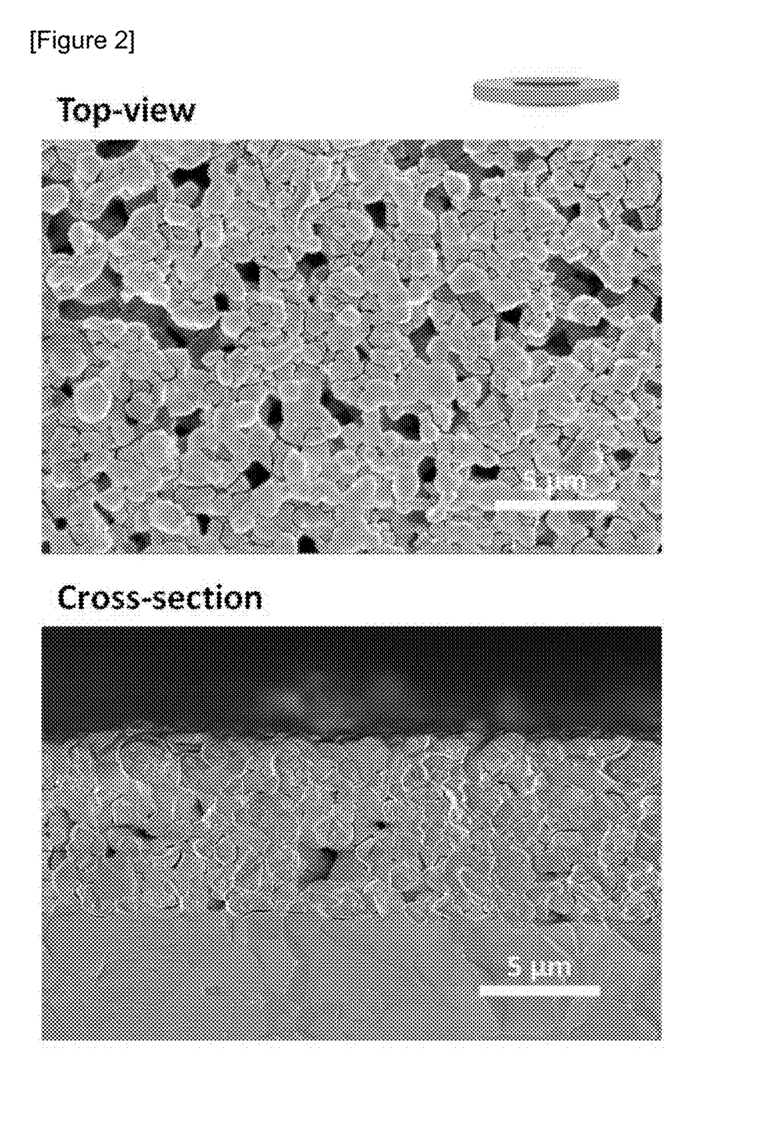
FIG. 2 shows the shape and cross-section of the half cell used in Example 2.

Mixed powder of NiO and GDC at a weight ratio of 6:4, Ink vehicle (Fuelcellmaterials company), and ethanol were mixed at a weight ratio of 1:1:0.5 to make paste, and it was applied on both sides of the sintered GDC specimen by screen printing, and then, it was sintered at 1400° C. for 10 hours. Finally, it was reduced and heat treated at 650° C. under 4% hydrogen atmosphere (4% $H_2$+96% Ar) to finally manufacture a porous Ni-GDC electrode (thickness about 8 um). The fine structure of the manufactured half cell was as shown in FIG. 2.

Step 2) Performance Evaluation in Half Cell

In the above manufactured half cell, at room temperature (23° C.), 10 uL of an aqueous solution in which $CsNO_3$ is dissolved (0.023 M) was directly introduced with a pipette in the porous Ni-GDC electrode, and then, the half cell was loaded in measurement system, and change in electrode resistance according to temperature was observed. Wherein, as applied gas atmosphere, 3% humidified 10% hydrogen (3% $H_2O$++10% $H_2$+87% Ar) was used, and the measurement result was shown in FIG. 3. For comparison, a half cell to which the promoter was not applied was measured together, and the half cell to which the promoter was not applied was designated as 'Ni-GDC', and the half cell to which the promoter was applied was designated as 'p-Ni-GDC'

Figure 3:
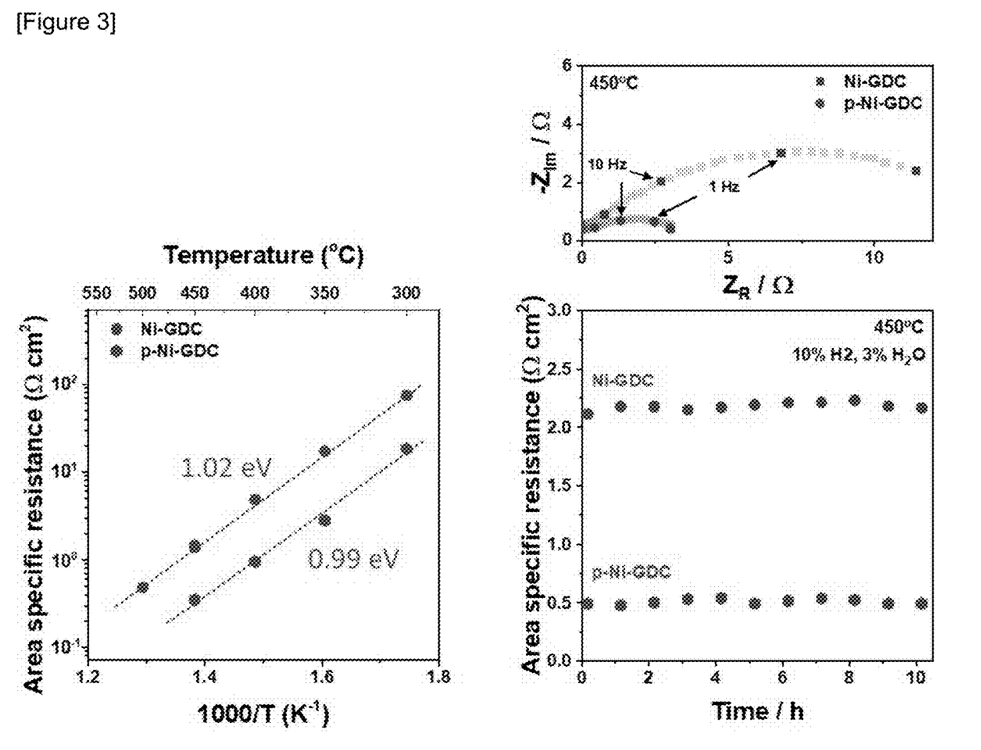
FIG. 3 shows the performance evaluation in the half cell according to Example 2.

As shown in FIG. 3, in the case of an electrode to which the promoter was applied (p-Ni-GDC), compared to common half cell control (Ni-GDC), resistance was significantly decreased, and stable resistance value was exhibited at 450° C. for 10 hours. Such a method can be applied in case the operation of a solid oxide fuel cell is stopped and the temperature is decreased to room temperature.

Example 3: Performance Evaluation in Half Cell

The half cell of step 1 of Example 2 was loaded on measurement system, and then, during the operation, 2 mL of an aqueous solution of $CsNO_3$ (0.1 M) was directly introduced in the half cell through a gas line using a syringe pump, thus evaluating the performance.

Figure 4:
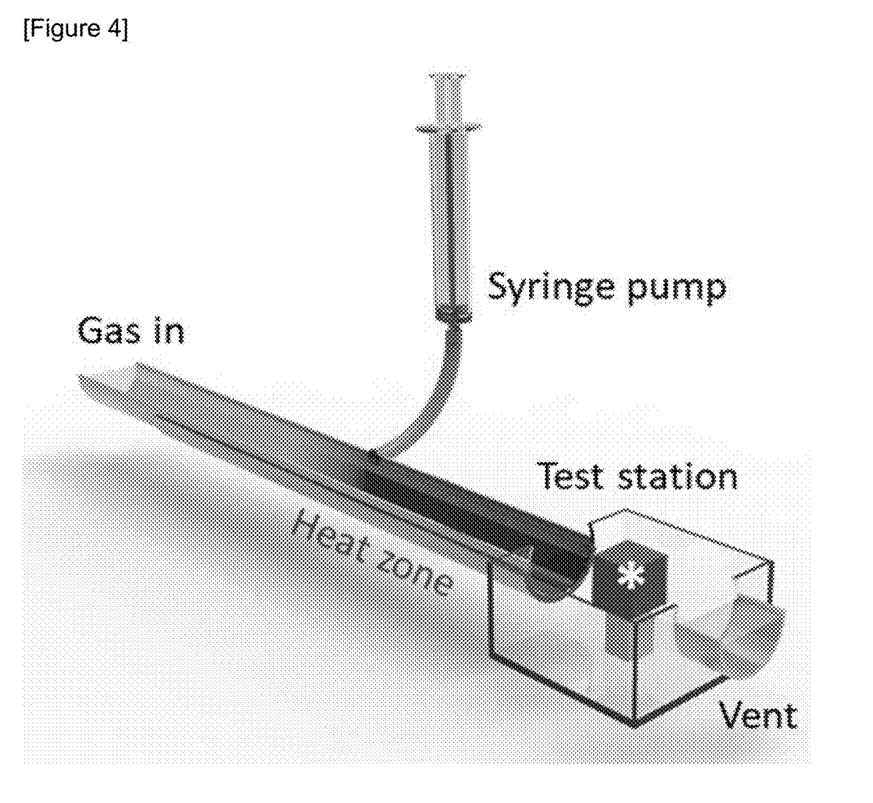
FIG. 4 schematically shows a method for loading a promoter in the half cell in Example 3.

First, as shown in FIG. 4, at the beginning, 3% humidified 10% hydrogen (3% $H_2O$+10% $H_2$+87% Ar) was introduced, and then, 2 mL of distilled water was introduced in a gas line heated above 120° C. as control.

Figure 5:
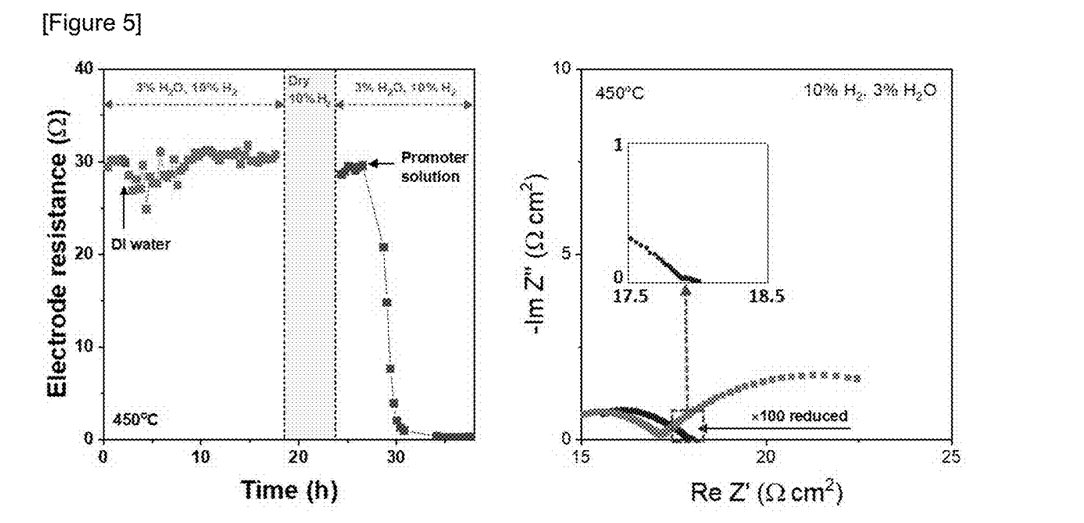
FIG. 5 shows the performance evaluation in the half cell according to Example 3.

As shown in FIG. 5, resistance change by water (sky blue) was not shown. Thereafter, the inside of device was dried so as to apply the same conditions, and then, 2 mL of an aqueous solution of $CsNO_3$ (0.1 M) was introduced under the same conditions, and electrode resistance (blue) rapidly decreased showing resistance decrease of 100 times or more as compared to control.

The Nyquist plot of the right of FIG. 5 shows values 10 hours after introducing distilled water and an aqueous solution of $CsNO_3$, respectively, and rapid performance improvement (resistance decrease) can be confirmed. Such a method can be applied while a solid oxide fuel cell is operated.

Example 4: Performance Evaluation in Full Cell

Step 1) Manufacture of Full Cell

NiO and GDC were mixed at the mass ratio of 6:4 through a ball mill (72 hours, 200 rpm) to prepare mixed powder for manufacturing an anode. The mixed powder was subdivided (about 0.4 g) and uniaxial-pressurized (2 MPa) to manufacture a molded product using a mold and extruder. Further then, it was heat treated at 900° C. for 1 hour to pre-sinter. In order to prepare an electrolyte, GDC powder was mixed with an ethanol-based solvent containing a dispersant and binder through a ball mill (48 hours, 180 rpm) and then, an electrolyte layer was deposited by drop coating. Further then, it was heat treated at 1500° C. for 5 hours to remove organic materials inside and prepare a dense electrolyte with a thickness of about 10 um. Further then, a cathode layer was prepared using material for preparing a cathode ($PrBa_{0.5}Sr_{0.5}Ce_{1.5}Fe_{0.5}O_{5+\delta}$) by screen printing, and then, sintered at 900° C. for more than 10 hours to prepare a cathode with a thickness of about 10 um, thus finally manufacturing a full cell.

Step 2) Performance Evaluation in Full Cell

In order to minimize contact resistance with an anode of SOFC Full Cell and wire connected outside, a small amount of $CsNO_3$ powder was mixed with silver paste used as a current collector and bonded to an electrode. For this purpose, 30 mg of $CsNO_3$ and silver paste were uniformly mixed using a mortar, and then, applied using a brush so as to completely cover the anode surface. The full cell was loaded on measurement system, and as commonly used gas conditions, air was introduced in the cathode, and 3% humidified hydrogen (3% $H_2O$+97% $H_2$) was supplied to the anode, and then, the performance according to operation temperature was evaluated, and the result was shown in FIG. 6 and the following Table 1. For comparison, a fuel cell without $CsNO_3$ powder was also measured, and the fuel cell without $CsNO_3$ powder was designated as 'Fuel Cell', and the fuel cell using $CsNO_3$ powder was designated as 'Promoted Fuel Cell'.

TABLE 1

| Temperature | Maximum performance of control (common Full Cell) | Maximum performance of promoter applied full cell | Performance improvement |
|---|---|---|---|
| 300° C. | 7 mW/cm$^2$ | 12 mW/cm$^2$ | +71% |
| 350° C. | 25 mW/cm$^2$ | 44 mW/cm$^2$ | +76% |
| 400° C. | 76 mW/cm$^2$ | 117 mW/cm$^2$ | +54% |
| 450° C. | 193 mW/cm$^2$ | 229 mW/cm$^2$ | +19% |
| 500° C. | 393 mW/cm$^2$ | 391 mW/cm$^2$ | — |

Figure 6:
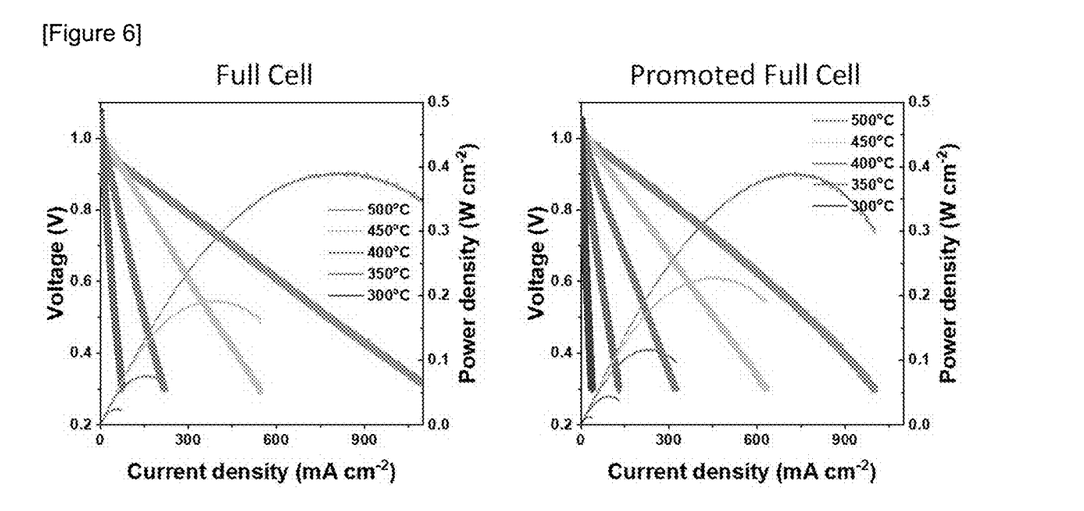
FIG. 6 shows the performance evaluation in the full cell according to Example 4.

As shown in FIG. 6 and Table 1, the application of a promoter resulted in about 19% performance improvement at the operation temperature of 450° C., and particularly, as the temperature decreased, performance improvement by the promoter was remarkably exhibited. Particularly, at the medium-low temperature region of 400° C. or less, high performance improvement of 50% or more was exhibited. This method can be applied as a dry process when a solid oxide fuel cell is manufactured and loaded.

Example 5: Performance Evaluation in Full Cell

For the Fuel Cell and Promoted Fuel Cell manufactured in Example 4, performances were evaluated as follows.

After confirming stable performance in 3% humidified hydrogen (3% $H_2O$+97% $H_2$) at 450° C., the fuel was converted into 3% humidified methane (3% $H_2O$+97% $CH_4$) and performance change was confirmed. Wherein, 0.8 V bias was applied, and the result was shown in FIG. 7.

Figure 7:
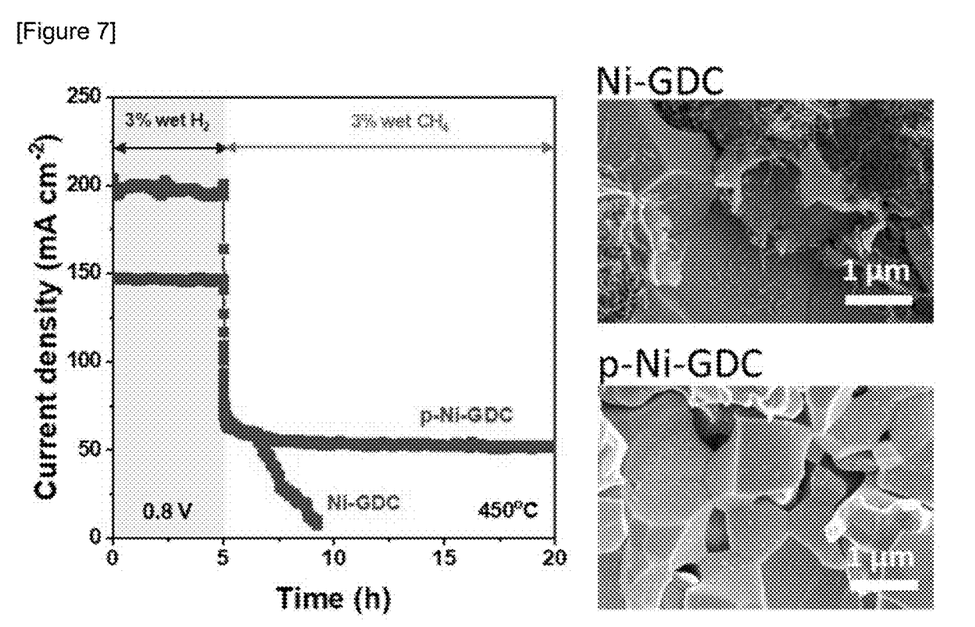
FIG. 7 shows the performance evaluation in the full cell according to Example 5.

As shown in FIG. 7, in the case of Fuel Cell as control, performance was deteriorated within 5 hours and it was difficult to operate (green), while the Promoted Fuel Cell exhibited stable performance (red). Further, as the result of observing each anode, in the case of Fuel Cell as control, carbon fiber was produced in a large quantity by carbon deposition, while in the Promoted Fuel Cell, carbon deposition was not generated within the operation time. Thus, it can be confirmed that carbon deposition in the anode was also inhibited by the promoter according to this disclosure.

The invention claimed is:

1. A method for manufacturing a solid oxide fuel cell which comprises a cathode, an anode, and an electrolyte between the cathode and anode,
    wherein at least a part of the pores of the anode comprises a promoter, and the promoter is an alkali metal compound, and
    wherein the alkali metal is lithium (Li), sodium (Na), potassium (K), or cesium (Cs),
    the method comprising steps of:
    introducing an alkali metal precursor in at least a part of the pores of the anode (step 1); and
    producing the promoter from the alkali metal precursor (step 2), wherein
    the alkali metal precursor is $M_2CO_3$ or $MNO_3$,
    the M is lithium (Li), sodium (Na), potassium (K), or cesium (Cs), and
    the step 2 comprises introducing fuel or moisture in a gas line for introducing fuel in the anode.

2. The method according to claim 1, wherein
    the step 1 comprises coating a solution comprising the alkali metal precursor on the surface of the anode, or immersing the anode in a solution comprising the alkali metal precursor.

3. The method according to claim 1, wherein
the step 1 comprises introducing a solution comprising the alkali metal precursor in the gas line for introducing fuel in the anode.

4. The method according to claim 1, wherein
the step 1 comprises bonding a current collector comprising the alkali metal precursor on the surface of the anode.

5. The method according to claim 1, wherein
the alkali metal compound is an alkali metal oxide, an alkali metal hydroxide, or a combination thereof.

6. The method according to claim 1, wherein
the promoter is $M_2O$, MOH, or a combination thereof, and the M is lithium (Li), sodium (Na), potassium (K), or cesium (Cs).

7. The method according to claim 1, wherein
the anode is a metal-ceramic composite.

8. The method according to claim 1, wherein
the anode of the solid oxide fuel cell has lower electrode resistance, compared to an anode of a solid oxide fuel cell that does not comprise the promoter.

* * * * *